United States Patent [19]

Seger

[11] 4,149,563

[45] Apr. 17, 1979

[54] ANTI-CAVITATION VALVE

[75] Inventor: Fritz O. Seger, Mission Viejo, Calif.

[73] Assignee: Copes-Vulcan, Inc., Lake City, Pa.

[21] Appl. No.: 769,406

[22] Filed: Feb. 16, 1977

[51] Int. Cl.² .......................................... F16K 47/08
[52] U.S. Cl. .............................. 137/625.3; 137/625.37
[58] Field of Search ........... 137/625.3, 625.37, 625.38,
137/625.32, 625.28; 251/124

[56] References Cited

U.S. PATENT DOCUMENTS

| 3,605,787 | 9/1971 | Krogfoss et al. | 137/625.38 X |
| 3,776,278 | 12/1973 | Allen | 137/625.38 |
| 3,880,399 | 4/1975 | Luthe | 137/625.37 X |

FOREIGN PATENT DOCUMENTS 1050626  2/1959  Fed. Rep. of Germany ...... 137/625.37

*Primary Examiner*—Arnold Rosenthal
*Attorney, Agent, or Firm*—Mandeville and Schweitzer

[57] ABSTRACT

The disclosure relates to a controllable valve structure, for throttling liquids under high pressure in a manner to minimize cavitation damage to the valve parts. The valve structure includes a cylindrical trim cage surrounding the valve seat and plug and formed with a relatively large multiplicity of passages for the radially inward flow of liquid. The orifices are so shaped and contoured that the effective throttling orifice of each is formed as close as practicable to the inner wall of the trim cage, causing formation of vena contracta in regions spaced as far as practicable from the walls of the trim cage. This reduces damage resulting from cavitation and correspondingly increases the useful operating life of the valve. In conjuction with the foregoing, the end face of the valve plug is recessed in the areas circumscribed by the annular valve seat, such that the inwardly displaced vena contracta are also displaced axially relative to the end face of the valve plug, minimizing cavitation damage to the plug, as well as to the trim cage. A specific valve construction is also disclosed, which achieves the theoretical objectives mentioned above which is, at the same time, capable of practical, economical manufacture.

9 Claims, 3 Drawing Figures

ANTI-CAVITATION VALVE

BACKGROUND AND SUMMARY OF INVENTION

In the operation of valves for controlling the flow of fluid under pressure, as for example in controlling the flow of feed water to a boiler, cavitation within the valve is always a matter of serious concern. Where excessive cavitation occurs, a throttling valve may be literally destroyed within a few hours of operation. Cavitation results from the fact that, during throttling of a liquid under pressure, the pressure drop of the liquid in the region of the throttling orifices tends to fall momentarily below the vapor pressure of the liquid. In the typical situation, where water is the control fluid, this causes the momentary formation of steam bubbles just downstream of the throttling surfaces. As the flowing liquid continues to travel beyond the throttling surfaces, there is an increase in the pressure to a point above the vapor pressure of the liquid, causing a sudden collapse or implosion of the steam bubbles. This results in a sonic shock wave, which is transmitted through the liquid to the adjacent surfaces of the valve. Where the energy of these shock waves exceeds the fatigue limits of the valve material, the material is quickly cavitated away, destroying the valve in a short time.

In order to minimize cavitation damage it has been proposed heretofore to effect the desired pressure drop in a series of individual steps, so calculated that the pressure drop in any individual step is sufficiently low that cavitation is avoided or greatly minimized. Other proposals involve dividing the flowing fluid into a large plurality of individual streams, such that the cavitation energy of each stream is reduced to an acceptable level. Although these prior proposals have made significant improvements in the operating life of high pressure throttling valves, cavitation remains a serious problem.

In accordance with the present invention, a novel and improved throttling valve is provided in which, in addition to generally minimizing the cavitation energies in accordance with known procedures, the valve is so designed and costructed as to locate the sites of bubble implosion in regions as remote as practicable from the valve parts in order to minimize the cavitation damage resulting from the bubble implosions, which are somewhat unavoidable. In this respect, the cavitation damage resulting from bubble implosion is an exponential function of the distance between the implosion site and the adjacent metal surfaces, such that increasing the distance between valve walls and implosion sites exponentially decreases the effect of the resulting shock wave on the valve parts.

In accordance with one aspect of the invention, a throttling valve in accordance with the above objective is provided with a cylindrical trim cage receiving a controllably positioned cylindrical valve plug. The trim cage is provided with a plurality of radial passages, of special configuration to be described, to permit the radially inward flow of liquid. As the valve plug is retracted from its seat and progressively withdrawn axially through the cylindrical trim cage, increasing numbers of the radial passages are uncovered by the valve plug, permitting progressively increased flow of fluid through the valve. Pursuant to the invention, each of the radial passages is of a configuration such that the effective throttling orifice formed thereby is located as close as practicable to the inner wall surface of the trim cage. In this respect, in accordance with known liquid flow behavior, the liquid both accelerates and contracts its flow stream as it approaches the effective orifice. After passing through the effective orifice, the flow stream continues to accelerate and contract for a predetermined distance, after which it begins to decelerate and expand. The region of lowest pressure of the fluid is the point at which the flow stream is most contracted and traveling at the highest velocity, in other words at the so-called vena contracta. If the pressure in the region of the vena contracta is below the vapor pressure of the liquid, which is often the case in practical applications, bubbles will form. As the flow stream thereafter begins to decelerate and expand, the pressure is increased and the bubbles are recompressed. Thus, the implosion sites of the bubbles typically are located slightly on the downstream side of the vena contracta.

Significant to the invention is an understanding that merely providing that the exit diameter of a radial passage in the trim cage be smaller than any other diameter of the passage will not result in locating the effective orifice at the inner wall of the trim cage. A fluid stream approaching an orifice and beginning to converge and accelerate, tends to form a funnel-like stream, the outer limits of which are of generally parabolic contour. Accordingly, even though the exit opening of the passage is smaller in diameter than any other part of the passage, any upstream portion of the passage that is smaller than the exponential (parabolic) flow contour will prematurely constrict the fluid flow and will serve as the effective orifice. To the extent that such effective orifice is upstream from the inner wall surface of the trim cage, the vena contracta will be formed closer to the wall than desired and, perhaps, even within the wall, so that the resulting implosion downstream of the vena contracta can occur closely adjacent to the valve surfaces, tending to cause excessive cavitation damage.

In accordance with another and more specific aspect of the present invention, a novel and improved throttling valve is provided in which a cylindrical trim cage is formed with a plurality of radial passages, of a generally exponentially converging configuration, yet which is capable of being produced in a practical manner utilizing conventional machining equipment. Toward this end, a theoretically ideal, exponentially converging radial passage is closely approximated by forming the passages in three stages. The innermost stage comprises the primary throttling orifice and is substantially cylindrical in form, of minimum but finite length. The second stage may be of substantially straight-walled conical form joining, at its convergent end, with the orifices section and expanding in a generally radially outward direction therefrom. The third stage of the passage is an arcuate outward flare, which is substantially tangent with the divergent end of the conical section and merges more or less into tangency with the outer walls of the trim cage. By following certain proportions and relationships, a trim cage may be constructed in accordance with the invention utilizing relatively standardized forms of tooling, yet at the same time closely approximating the theoretically desirable exponentially converging radial passage.

For a better understanding of the above and other features and advantages of the invention, reference should be made to the following detailed description of a preferred embodiment and to the accompanying drawings.

DESCRIPTION OF A PREFERRED EMBODIMENT

Figure 1:
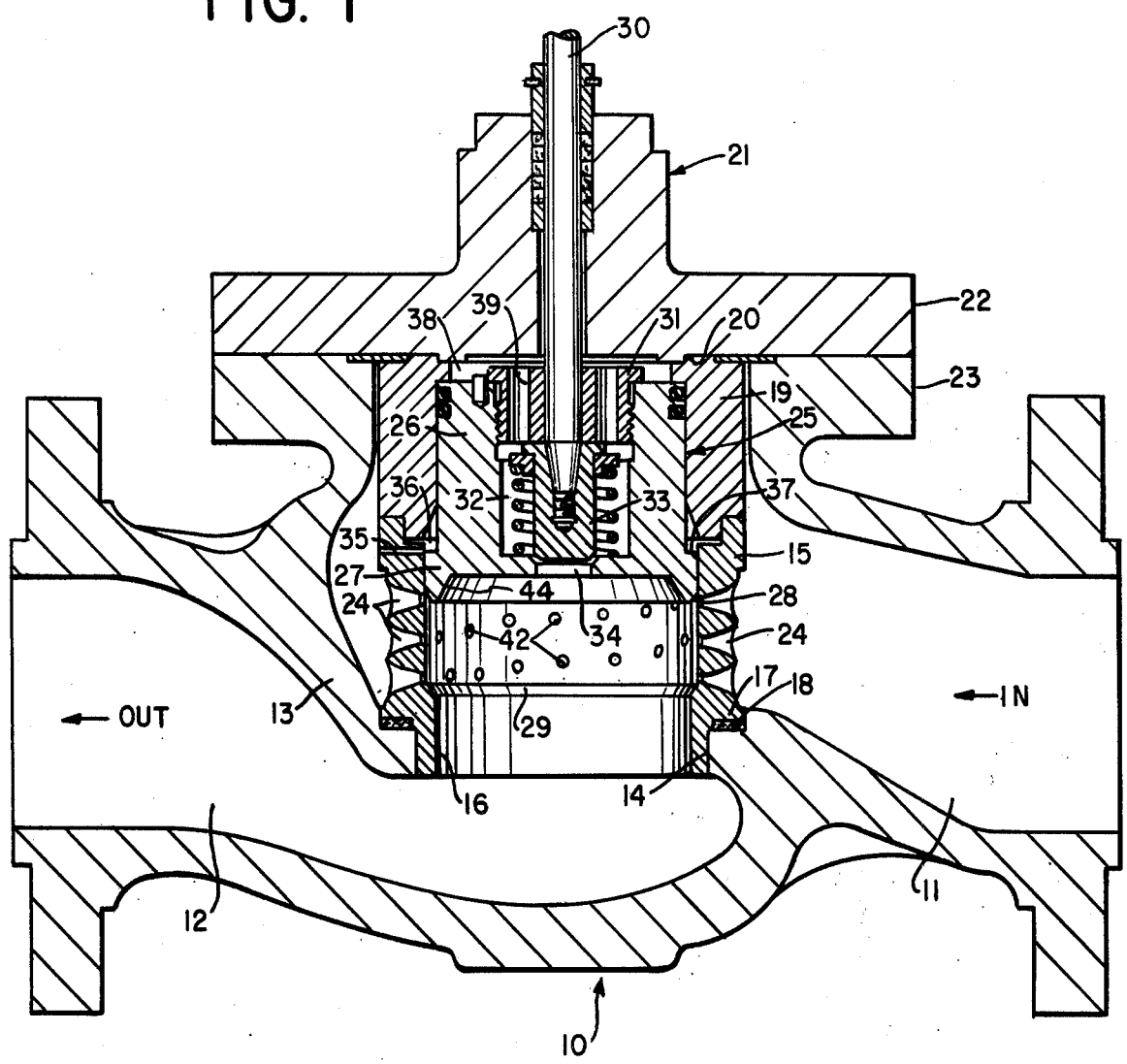
FIG. 1 is a longitudinal cross sectional view of a typical form of high pressure liquid throttling valve constructed in accordance with the principles of the invention.

Referring now to the drawings, the reference numeral 10 designates generally a valve body of a fluid control valve, such as might be used in controlling the flow of water under high pressure, for example, as in a boiler feed system. The valve body has an inlet passage 11 and an outlet passage 12. Dividing and separating the inlet and outlet passages is an internal web 13 provided with an opening 14 forming a valve passage and mounting the primary valve parts.

Seated within the web passage 14 is a generally cylindrical trim cage 15 having an extension 16 of reduced diameter extending into the web opening 14 and having a shoulder 17 seated in sealed relation against a corresponding shoulder 18 formed on the dividing web 13. A balancing cylinder 19 is seated on top of the trim cage 15 and extends from the top of the trim cage to and in contact with lower surfaces 20 of the valve bonnet 21. The bonnet 21 typically is secured to the valve body 10 by flanges 22, 23 of the bonnet and valve body respectively, which may be bolted together in a conventional manner. The trim cage 15, balancing cylinder 19, web 13 and bonnet 21 form a sealed assembly, such that fluid flowing from the inlet passage 11 to the outlet passage 12 is required to flow in a controlled manner through openings 24 (to be described) in the trim cage. In this respect, it will be noted in FIG. 1 that the configuration of the valve body is such as to provide fluid access to the trim cage about its entire outer cylindrical surface, so that fluid may flow radially inward through the openings 24 from all sides of the trim cage.

In the illustrated form of valve, a balanced valve plug 25 is slideably received within the trim cage 15 and balancing cylinder 19 for controlled vertical positioning. The upper end 26 of the valve plug is of slightly reduced diameter and is slideably guided by the balancing cylinder 19. The lower portion 27 of the valve plug is of slightly enlarged diameter and is arranged to be slideably guided within the trim cage. The lower end of the valve plug, adjacent its outer wall, is provided with a tapered annular valve surface 28 arranged for cooperation with a similarly tapered annular valve seat 29 in the lower portion of the trim cage. The arrangement is such that, when the plug 25 is in its lowermost position, the valve surface 28 mates with this valve seat 29 to completely close the valve. As the valve plug 25 is progressively raised within the trim cage 15, more and more of the flow passages 24 are uncovered, permitting a progressively increasing flow of liquid through the valve, as will be more particularly described hereinafter.

In the illustrated valve construction, positioning of the plug 25 is controlled by a valve stem 30, which extends up through the bonnet 21 and is connected to a suitable actuator (not shown) such as a threaded hand wheel or a pilot actuator. The lower end of the valve stem 30 extends slideably through a bushing 31, which is threadedly received within an internal recess 32 in the valve plug. Below the bushing, the valve stem is connected to a pilot plug 33, which is adapted for limited vertical movement relative to the valve plug, between an open position, as illustrated in FIG. 1, in which the upper end of the pilot plug is abutted against the bushing 31, and a closed position in which the lower end of the pilot plug is seated in an opening 34 in the bottom of the valve plug.

In order to close the valve, the valve stem 30 and the pilot plug 33 are moved downwardly. By reason of a constant downward pressure bias on the valve plug, it moves downward with the valve stem 30. In this respect, a bleed passage 35 is provided in the upper wall of the trim cage 15, communicating with an annular area 36 above the shoulder 37 formed by the enlarged lower end 27 of the plug. Thus, the upstream or high pressure is at all times acting upon the narrow annular area of the plug formed by the shoulder 37. When the valve is at least partly open, downstream (lower) pressure acts on the bottom face of the plug and also on the reduced-area upper end, providing a net downward bias from high pressure acting on the shoulder 37.

When the valve plug reaches a fully closed position, the pilot plug 33 becomes seated in the opening 34. The valve plug clearances with the balancing cylinder 19 are such as to permit leakage of the upstream pressure into the area 38 directly above the upper end of the valve plug tending to urge the plug in a downward direction. Thus, when the plug is fully seated against the valve seat 29, the valve is held tightly closed by the substantial differential pressure acting upon the upper and lower surfaces of the valve plug 25.

In order to open the valve plug, the stem 30 is controllably raised. Initially, this will serve to withdraw the pilot plug 33 from the opening 34, connecting the upper chamber 38 to the downstream pressure, through the recess 32 and bushing passages 39. This reduces the pressure unbalance on the plug to a predetermined bias resulting from the upstream pressure acting upon the shoulder 37. Continued, controlled upward movement of the valve stem 30 causes the pilot plug 33 to seat against the lower surface of the bushing 31 and then to mechanically lift the valve plug against the downward biasing pressure against the shoulder 37. In any position of the valve other than fully closed, the valve plug is slightly biased in a closing direction by pressure against the shoulder 37, while being mechanically restrained by the valve stem 30. Thus, the plug can be controllably moved and retained in any desired position by manipulation of the stem 30. This manner of controlling the position of the valve plug is, of course, well known in the art and is reflected in, for example, the Schnall U.S. Pat. No. 3,575,213.

In accordance with the invention, the trim cage 15 and valve plug 25 of the valve are constructed in a novel and unique manner to enable the valve to be utilized in difficult environments, such as the control of the flow of high temperature water under high pressure conditions without excessive cavitation damage. To this end, the valve is constructed in accordance with unique principles, such that the nature and location of the vena contracta in relation to surfaces within the valve structure signicantly minimizes cavitation damage to the valve components.

It is recognized in the art that cavitation damage in a high pressure liquid throttling valve is a function of the size of the vena contracta and also the distance of the vena contracta from adjacent valve surfaces. These two considerations are mutually related and to some extent conflicting in that potential for cavitation damage can be reduced by subdividing the main flow stream into a larger number of smaller streams, so that the bubble implosion energy content derivable from any stream is less. At the same time, however, as the individual flow streams become smaller, the locations of the vena contracta are closer to the valve orifices. And since the potential for cavitation damage from bubble implosion is an exponential function of the distance between the implosion site and the nearest surfaces, merely reducing the size of the flow passages, for example is reflected in U.S. Pat. No. 3,776,278 and No. 3,880,399, does not provide an optimum approach to minimizing cavitation damage.

In accordance with the present invention, the radial fluid flow passages 24 in the trim cage 15 are constructed and arranged in accordance with novel principles such that, while subdividing the fluid flow into a multiplicity of passages, the vena contracta may at the same time be positioned as far as practicable from any surface of the valve for optimum minimization of cavitation damage. To this end, the fluid passages 24 are so constructed and contoured that the effective orifice is located as close as practicable to the inner wall surface of the trim cage, causing the vena contracta formation to be as far removed from such surface as is practicable under the circumstances.

Figure 2:
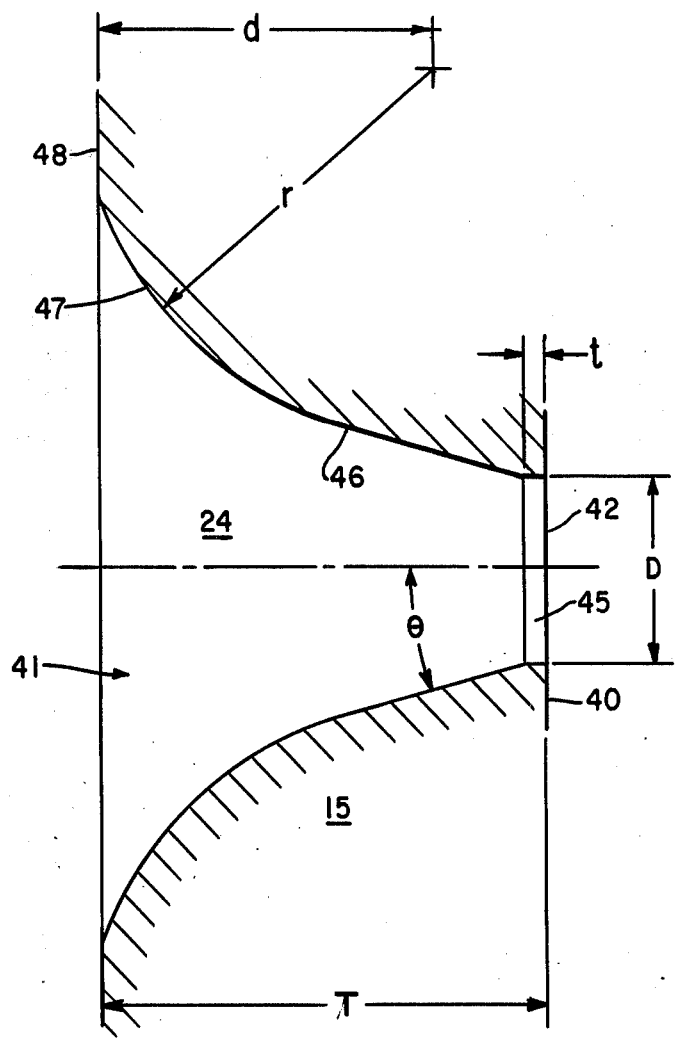
FIG. 2 is a greatly enlarged, fragmentary cross sectional view of the trim cage incorporated in the valve of FIG. 1, illustrating details of the configuration of fluid passages therein.

With reference now to FIG. 2 of the drawing, a greatly enlarged fragmentary section of the trim cage 15 is illustrated, showing details of a single radial fluid flow passage 24. The present invention is based upon the observation that a liquid under high pressure, in flowing through a restricted orifice, will approach the orifice in a progressively converging flow path, with the fluid within that path gradually increasing in velocity. In general, the liquid follows an exponentially converging flow path, the outer contours of which are more or less parabolic in regions close to the effective orifice. Pursuant to this observation, the desired orifice is formed as close as practicable to the inner wall surface 40 of the trim cage, and the inlet passage areas leading to the orifice are formed substantially to follow the theoretically ideal exponentially converging configuration.

A significant aspect of the invention resides in so forming the inlet regions 41 of the flow passages 24 that the liquid can follow its natural, exponentially converging flow path to the orifice, designated 42 in FIG. 2, located closely adjacent the inner wall 40. In this respect, even though the orifice opening 42 is the smallest diameter portion of the passage 24, if any part of the inlet region 41 of the passage is of significantly smaller diameter than the exponentially converging envelope, that smaller diameter portion, even though substantially larger than the orifice opening 42, will become an effective orifice in the passage, setting up a vena contracta close to the wall of the trim cage and perhaps even within the passage itself, so that significant cavitation damage can be expected under severe operating conditions.

By forming the flow passages 24 with an exponentially decreasing contour leading up to the effective orifice 42 closely adjacent the inner wall 40, the liquid flowing radially inward through the passage issues from the orifice 42 at high velocity, continuing to converge slightly for a distance beyond the wall 40. This is reflected in the flow path lines shown as arrows flowing left to right through the orifice 42 in FIG. 2. At a certain point, spaced inward from the wall 40, the flow reaches a maximum velocity and a minimum diameter, and this point is referred to as the vena contracta, being indicated by the vertical line labeled "VC". At this point, the pressure in the flowing fluid, according to Bernoulli's Law, is at its minimum and, if it is below the vapor pressure of the liquid, as is often the case, bubbles will form in the liquid and the stream will begin to loose integrity. Immediately as it passes the vena contracta, the flowing liquid looses velocity and increases in pressure, and the bubbles, if formed, will collapse and implode as the pressure builds up to exceed the vapor pressure level. Since the formation of the vena contracta, and therefore the related formation and implosion of bubbles, is determined by the flow of liquid through the effective orifices of the passage, it is possible according to the invention to remove the situs of bubble implosion as far as practicable from the wall surface 40 through the expedient of locating the effective orifice 42 as close as practicable to that surface. This can only be accomplished, however, by properly contouring the inlet portions of the passage 24, so that the fluid may approach the desired orifice 42 along an exponentially converging flow path, and no portion of the inlet area of the passage is permitted to form an effective orifice.

Inasmuch as cavitation damage resulting from bubble implosion has been observed to be an exponential function of the distance of the implosion site from the adjacent metal surface, effective removal of the implosion site from the wall surface makes possible significant improvement in valve performance as regards cavitation. It is believed, in this respect, that the energy impact of bubble implosion on the walls of the adjacent valve parts is relatively harmless as long as the metal is not stressed above its fatigue levels. Where the stress is significantly above such fatigue levels, the integrity of the metal is quickly destroyed and the valve can be eroded to a point of inoperability in a relatively few hours of operation.

In conjunction with the above described feature of the invention, it is particularly advantageous to recess the lower end face of the valve plug 25, in the areas circumscribed by the annular valve surface 28. Thus, as reflected in FIG. 3, in many positions of the valve plug 25, the annular rib 43, forming the lowermost extremity of the valve plug, may be located closely adjacent to one or more of the inlet passages 24 of the trim cage. In such cases, even though the inlet passages 24 are formed in accordance with the above described aspects of the invention, to locate the vena contracta as far as practicable inside the inner wall 40 of the trim cage, the bubble implosion sites could still be located closely adjacent to the end surface of an unrecessed plug 25. Accordingly, as a further aspect of the invention, the plug end face is recessed at 44, at least in an annular region adjacent to the vena contracta "VC" and the related bubble implosion sites, and preferably over the entire end surface of the plug circumscribed by the annular rib 43.

Figure 3:
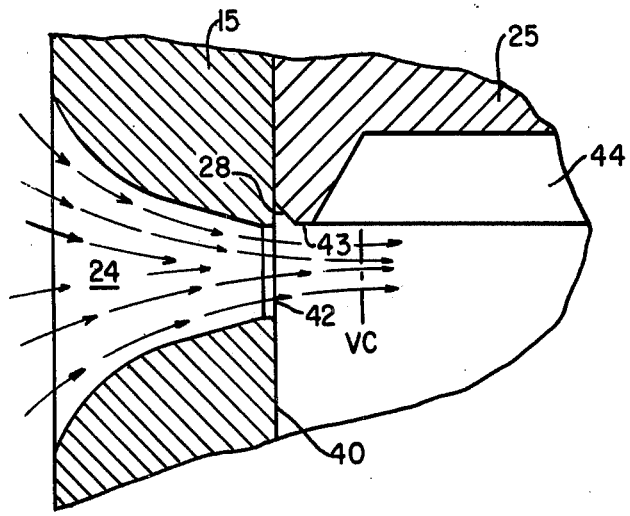
FIG. 3 is an enlarged, fragmentary cross sectional view illustrating the relationship of the new trim cage fluid passages in conjunction with an axially recessed valve plug.

As will be readily apparent in FIG. 3, by recessing the plug end face at 44, the vena contracta and the resulting sites of bubble implosion are kept removed as far as practicable under the circumstances from adjacent surfaces of the valve plug. And, while valve plugs with recessed end faces have been utilized heretofore in other contexts, there is particular significance in the utilization of such recessed end faces in conjunction with inwardly displaced vena contracta pursuant to the present invention. In a valve in which the trim cage has inlet passages of conventional configuration, forming vena contracta which are not significantly displaced inwardly from the inner wall surface of the trim cage, little of any advantage would be realized from the utilization of a recess end face on the valve plug, as will be appreciated.

Throttling valves of the type herein contemplated typically are of relatively large diameter, intended for high pressure, high temperature service in industrial applications, such as in connection with public utility power generating equipment and the like. Accordingly, the valves frequently may be of custom or partially custom design, such that large production runs of identical devices is not a normal expectation. Accordingly, as a further and more specific feature of the invention, the design of the fluid flow passages 24 is such as to enable the desired exponentially converging flow path to be closely approximated, while at the same time enabling the article to be machined on a custom or partly custom basis with relatively uncomplicated and economical tooling and machining techniques. To this end, the contours of the passage are not purely exponential, but are a combination of radiused and straight line portions, in conjunction with a short but finite generally cylindrical section at the inner wall extremity.

Referring now more specifically to FIG. 2, the inlet passage 24 is typically formed of three stages, a short but finite cylindrical section 45, whose diameter is equal to the diameter of the desired effective orifice 42. The cylindrical section 45 is located immediately adjacent the inner wall 40 of the trim cage. Connecting the short cylindrical section 45 is an outwardly divergent conical section 46, and joining the conical section is an outwardly flaring radiused section 47, which merges into substantial tangency with the conically diverging section 46, and joins with the outer surface 48 of the trim cage. Depending on the thickness of the trim cage, the outwardly flaring section 47 may merge into substantial tangency with the outer surface portions of the trim cage, but this is not necessary and may be indeed even be precluded by the closeness of adjacent passages.

The provision of the short but finite cylindrical section 45 has practical significance in that it assures uniformity in the final diameter of the orifice. Were the conically divergent portion 46 to be machined through to the inner wall 40, expected variations in the depth of the machining operations would result in variations in the diameter of the opening, which could be undesirable. The axial length of the cylindrical portion 45 is sufficient only to provide a reasonable machining tolerance while assuring uniformity in the diameter of the holes. In practice, an axial length of about 0.8 mm has been found to be ample for substantially all typical sizes of the valve. This axial length is indicated by the letter "t" in FIG. 2.

The diameter "D" of the effective orifice 42 desirably has an optimum relationship with the thickness "T" of the wall of the cylindrical trim cage 15, in order to reasonably accommodate an exponentially converging flow path to the orifice. In a relatively small diameter valve (e.g., 50–75 mm) the orifice diameter typically might be around 2.4 mm, and the wall thickness typically might be on the order of around 5.5 mm. In a very large valve (e.g., around 350 mm) the orifice diameter "D" typically might be on the order of 18 mm, while the thickness of the trim cage wall might be on the order of 45 mm. In general, it appears that the optimum ratio of trim cage wall thickness "T" to orifice diameter "D" is usually greater than two to one, but generally does not significantly exceed 2.5 to one.

For the purpose of the invention, the desired exponentially converging flow path may be adequately approximated in the conically divergent region 46 by forming a conical section with a 30° included angle. That is, the angle $\theta$ between the wall and the central axis, will be about 15°. This angle appears to be appropriate for the complete typical size range of valves.

The center of curvature and the radius of the outwardly flaring portion 47 of the flow passage advantageously may be determined by observing optimum ratios with respect to the orifice diameter "D". For example, the radius "r" of curvature at the inlet end typically may be about twice the diameter of the orifice, for all valve sizes. The center of curvature is spaced inward from the outer wall extremity 48 a distance "d" equal to about 1.75–1.85 times the orifice diameter "D" for a typical range of valve sizes. Having established this distance "d", the center of curvature may be located precisely by commencing the arc in tangency with the conically divergent section 46.

By following or approximating the above described simple dimensional relationships, suitable tooling for economically producing the desired contour of inlet passage 34 may be easily provided and utilized.

The improved valve construction of the invention provides a highly efficient throttling valve for high pressure, high temperature liquid service, in which cavitation damage is significantly reduced by so contouring the trim cage flow passages that the vena contracta of the individual flow streams are removed as far as practicable from any metal surfaces of the valve. By establishing the effective flow orifice immediately adjacent the inner wall surface of the trim cage, and forming an exponentially contracting flow passage leading thereto, it is assured that the formation of vena contracta, and therefore the sites of bubble implosion, will be displaced inwardly as far as practicable from the surfaces of the trim cage. Since cavitation damage resulting from bubble implosion is an exponential function of distance, significant reduction in cavitation damage potential is thus realized.

As a subsidiary feature of the invention, it is made possible to construct a valve to realize the theoretical objective required, while at the same time utilizing relatively simple tooling and machining techniques. This is accomplished by closely approximating the exponentially converging flow path utilizing a connected series of cylindrical, conical and radiused passage sections.

By combining, together with the inwardly displaced vena contracta, a valve plug whose end face is recessed in regions directly above the bubble implosion sites, additional improvements in cavitation avoidance are realized.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. An anti-cavitation valve for controlling the flow of liquid under high pressure, wherein the valve comprises
   (a) a valve body forming a liquid inlet and a liquid outlet,
   (b) a tubular generally cylindrical trim cage received in the valve body and provided with multiple radial flow passages for the flow of liquid from one side to the other of said trim cage wall,
   (c) said trim cage having an upstream surface associated with said liquid inlet and a downstream surface associated with said liquid outlet,
   (d) a valve plug slideably received within said trim cage and operable when moved in a valve-opening direction to progressively uncover and open for liquid flow the downstream ends of said radial passages,
   (e) said radial flow passages being formed to provide a generally exponentially converging flow path in the upstream-to-downstream flow direction through said trim cage wall,
   (f) said flow passage including a cylindrical section of finite but minimum length forming the downstream extremity of the passage,
   (g) a conically divergent flow passage section expanding in the upstream direction from said cylindrical section, and
   (h) an arcuately flaring flow passage section leading upstream from the upstream end of said conical section,
   (i) said conically divergent and said arcuately flaring flow passage sections substantially approximating the contours of an exponentially converging passage leading to said cylindrical section,
   (j) the effective flow orifices of said passages being located immediately adjacent the downstream surface of said trim cage, whereby the vena contracta of liquid streams flowing through said passages are displaced as far as practicable from the surfaces of said valve.

2. An anti-cavitation valve for controlling the flow of liquid under high pressure, comprising
   (a) a valve body forming a liquid inlet and a liquid outlet,
   (b) a generally cylindrical trim cage received in said valve body and provided with multiple radial flow passages for the flow of liquid radially through said trim cage,
   (c) said radial flow passages having upstream and downstream ends,
   (d) a valve element associated with said valve body for variably controlling the flow of liquid,
   (e) said radial passages being so formed and contoured as to provide discharge openings at their downstream ends immediately adjacent the downstream wall surface of the trim cage,
   (f) said radial passages being generally exponentially convergent toward said discharge openings,
   (g) said discharge openings being formed by cylindrical passage sections of finite but minimum length,
   (h) said radial passages being so formed and dimensioned upstream of said discharge openings as to permit naturally convergent flow of liquid in the upstream regions of said passages whereby said discharge openings also form the effective orifices of said passages and whereby vana contracta of liquid streams flowing through said radial passages are displaced as far as practicable in a downstream direction from the downstream wall surface of said trim cage,
   (i) said radial passages being generally exponentially convergent toward said discharge openings.

3. An anti-cavitation valve for controlling the flow of liquid under high pressure, comprising
   (a) a valve body forming a liquid inlet and a liquid outlet,
   (b) a generally cylindrical trim cage received in said valve body and provided with multiple radial flow passages for the flow of liquid radially through said trim cage,
   (c) said radial flow passages having upstream and downstream ends,
   (d) a valve element associated with said valve body for variably controlling the flow of liquid,
   (e) said radial passages being so formed and contoured as to provide discharge openings at their downstream ends immediately adjacent the downstream wall surface of the trim cage,
   (f) said radial passages being generally exponentially convergent toward said discharge openings,
   (g) said discharge openings being formed by cylindrical passage sections of finite but minimum length,
   (h) said radial passages being so formed and dimensioned upstream of said discharge openings as to permit naturally convergent flow of liquid in the upstream regions of said passages whereby said discharge openings also form the effective orifices of said passages and whereby vena contracta of liquid streams flowing through said radial passages are displaced in a downstream direction from the downstream wall surface of said trim cage.

4. An anti-cavitation valve according to claim 2, further characterized by
   (a) the diameter of said discharge openings being generally on the order of 40 to 50 percent of the thickness of the wall of said trim cage.

5. An anti-cavitation valve according to claim 2, further characterized by
   (a) said flow passages being arranged to provide for the radially inward flow of liquid through the walls of said trim cage,
   (b) said valve element being a plug-like member having an end face and being slideable within said trim cage to controllably open or close radial passages, and
   (c) means forming an axial recess in portions of the end face of said plug-like valve element whereby the material of said element is displaced from the sites of bubble implosion in liquid streams issuing from said passages.

6. An anti-cavitation valve according to claim 5, further characterized by
   (a) said valve element being formed with an annular valve-surface-forming rib surrounding said axial recess.

7. An anti-cavitation valve according to claim 3, further characterized by
   (a) said passages comprising conically converging sections forming at their smaller ends with said cylindrical passage sections, (b) said conically converging sections having an included angle of approximately 30°, and
(c) the larger or upstream ends of said conically converging sections merging with outwardly flaring portions having a radius of curvature of around twice the diameter of said cylindrical passage sections.

8. An anti-cavitation valve according to claim 7, further characterized by
(a) the centers of curvature of said outwardly flaring portions being located in a downstream direction from the upstream wall of said trim cage a distance of around 1.75–1.85 times the diameter of said cylindrical passage sections.

9. An anti-cavitation valve for controlling the flow of liquid under high pressure, wherein the valve comprises
(a) a valve body forming a liquid inlet and a liquid outlet,
(b) a tubular generally cylindrical trim cage received in the valve body and provided with multiple radial flow passages for the flow of liquid from one side to the other of the trim cage wall,
(c) said trim cage having an upstream surface associated with said liquid inlet and a downstream surface associated with said liquid outlet,
(d) a valve plug slidably received within said trim cage and operable when moved in a valve-opening direction to progressively uncover and open for liquid flow the downstream ends of said radial passages,
(e) said radial flow passages being formed to provide a generally exponentially converging flow path in the upstream-to-downstream flow direction through said trim cage wall,
(f) the effective flow orifices of said passages being located immediately adjacent the downstream surface of said trim cage, whereby the vena contracta of liquid streams flowing through said passages are displaced as far as practicable from the surfaces of said valve,
(g) said valve plug having an end face and an annular valve surface about its end face,
(h) said valve including an annular valve seat cooperable with said annular valve surface for fully closing said valve, and
(i) said valve plug end face being recessed in areas circumscribed by said annular valve surface, whereby end face surfaces of said valve plug are displaced from said vena contracta.

* * * * *